US010183371B2

(12) United States Patent
Corletto et al.

(10) Patent No.: US 10,183,371 B2
(45) Date of Patent: Jan. 22, 2019

(54) SENSING AND POSITIONING DEVICE FOR A MACHINING HEAD OF A MACHINE TOOL, MACHINE TOOL COMPRISING SUCH A DEVICE, AND ASSOCIATED MACHINING METHOD

(71) Applicant: BRETON SPA, Castello di Godego (TV) (IT)

(72) Inventors: Gabriele Corletto, Cittadella (IT); Eddy Zen, Bassano del Grappa (IT); Luca Toncelli, Bassano del Grappa (IT)

(73) Assignee: Breton SPA, Castello Di Godego (TV) (IT)

( * ) Notice: Subject to any disclaimer, the term of this patent is extended or adjusted under 35 U.S.C. 154(b) by 0 days.

(21) Appl. No.: 15/001,503

(22) Filed: Jan. 20, 2016

(65) Prior Publication Data
US 2016/0207157 A1    Jul. 21, 2016

(30) Foreign Application Priority Data
Jan. 21, 2015  (IT) .............................. TV2015A0011

(51) Int. Cl.
*B23Q 17/22*    (2006.01)
*B23Q 1/54*    (2006.01)
(Continued)

(52) U.S. Cl.
CPC ......... *B23Q 17/22* (2013.01); *B23Q 17/2233* (2013.01); *G01B 5/012* (2013.01);
(Continued)

(58) Field of Classification Search
CPC ......... B23Q 5/04–5/20; B23Q 2705/02; B23Q 2705/023; B23Q 2705/026;
(Continued)

(56) References Cited

U.S. PATENT DOCUMENTS 4,338,723 A    7/1982  Benjamin
4,406,069 A *  9/1983  Clement ................ G01B 5/245
                                              33/520
(Continued)

FOREIGN PATENT DOCUMENTS

DE    102009012155 A1    9/2010
EP          1764186 A1 *  3/2007 ............ B23Q 1/265
(Continued)

OTHER PUBLICATIONS

EP 1764186 Machine Translation, pp. 3-5, Oct. 11, 2017.*
(Continued)

*Primary Examiner* — Nicole N Ramos
(74) *Attorney, Agent, or Firm* — Fredrikson & Byron, P.A.

(57) ABSTRACT

A sensing and positioning device adapted to be mounted on a spindle of a machine tool including: a fixing element; and at least three sensing elements adapted to be connected operationally to a programmable control unit of a machine tool. The sensing and positioning device is adapted to be used with a machining tool mounted on the spindle. A machine tool including a workpiece table, a machining head, and movement means adapted to move the machining head above the workpiece table. The machine further includes the device described above. An associated machining method is also described.

19 Claims, 9 Drawing Sheets

(51) Int. Cl.
*B23B 39/14* (2006.01)
*B23B 41/16* (2006.01)
*G01B 5/012* (2006.01)
*B23Q 15/00* (2006.01)
*B23Q 17/24* (2006.01)

(52) U.S. Cl.
CPC .......... *B23Q 15/00* (2013.01); *B23Q 17/2466* (2013.01); *B23Q 17/2471* (2013.01); *B23Q 2220/006* (2013.01); *Y10T 408/16* (2015.01); *Y10T 409/306832* (2015.01); *Y10T 409/307224* (2015.01); *Y10T 409/308008* (2015.01)

(58) Field of Classification Search
CPC .......... B23Q 2705/04; B23Q 2220/006; B23Q 17/22; B23Q 17/2208; B23Q 17/2216; B23Q 17/2225; B23Q 17/2233; B23Q 17/2241; B23Q 17/225; B23Q 17/2258; B23Q 17/2266; B23Q 17/2275; B23Q 17/2283; B23Q 17/2291; Y10T 409/306832; Y10T 409/306888; Y10T 409/307224; Y10T 409/30728; Y10T 409/308008; Y10T 409/308064; Y10T 409/30812; Y10T 408/16; Y10T 408/165; Y10T 408/17; Y10T 408/172; Y10T 408/173; Y10T 408/175; Y10T 409/300896
USPC ....... 409/231, 232, 188, 195, 186, 187, 193, 409/194, 207, 208, 209
See application file for complete search history.

(56) References Cited

U.S. PATENT DOCUMENTS

| | | | | |
|---|---|---|---|---|
| 4,506,448 A * | 3/1985 | Topping | ............... | B25J 15/00 33/520 |
| 4,750,835 A * | 6/1988 | McMurtry | ........... | G01B 11/002 250/208.6 |
| 4,766,703 A * | 8/1988 | Rattazzini | ............... | B23Q 1/76 451/24 |
| 5,715,068 A * | 2/1998 | Izor | ..................... | B23B 31/1622 358/3.29 |
| 6,568,096 B1 * | 5/2003 | Svitkin | .................... | B23Q 1/76 33/501.02 |
| 6,973,738 B2 * | 12/2005 | Kaneda | .................. | B23Q 17/22 33/628 |
| 7,200,516 B1 * | 4/2007 | Cowley | .................. | B23B 49/00 356/138 |
| 7,992,311 B2 * | 8/2011 | Cerwin | ................ | B23B 49/006 33/286 |
| 8,650,729 B2 * | 2/2014 | Momoi | .................... | B23B 1/00 29/27 C |
| 2007/0030486 A1 * | 2/2007 | Gelbart | ............. | B23Q 17/2233 356/399 |
| 2012/0004760 A1 * | 1/2012 | Bonerz | ............. | B23Q 17/2208 700/178 |
| 2012/0162406 A1 * | 6/2012 | Schmidt | .................. | B23B 49/00 348/95 |
| 2012/0179287 A1 * | 7/2012 | McGlasson | ......... | B23F 23/1218 700/195 |
| 2013/0071198 A1 * | 3/2013 | Kiryu | ................... | B23Q 15/013 409/80 |
| 2014/0053423 A1 * | 2/2014 | Brenner | ................ | G01B 5/012 33/503 |
| 2015/0202728 A1 * | 7/2015 | Ebihara | ............. | B23Q 11/0035 279/3 |
| 2016/0184951 A1 * | 6/2016 | Kurokawa | ............... | B25J 11/00 408/8 |

FOREIGN PATENT DOCUMENTS

| | | | | |
|---|---|---|---|---|
| EP | 2957383 A1 * | 12/2015 | ............ | B23Q 15/14 |
| JP | 2014073571 A | 4/2014 | | |
| WO | 0039522 A1 | 7/2000 | | |

OTHER PUBLICATIONS

Italian Search Report and Written Opinion dated Sep. 9, 2015 for IT TV20150011, from which the instant application is based, 8 pgs.

* cited by examiner

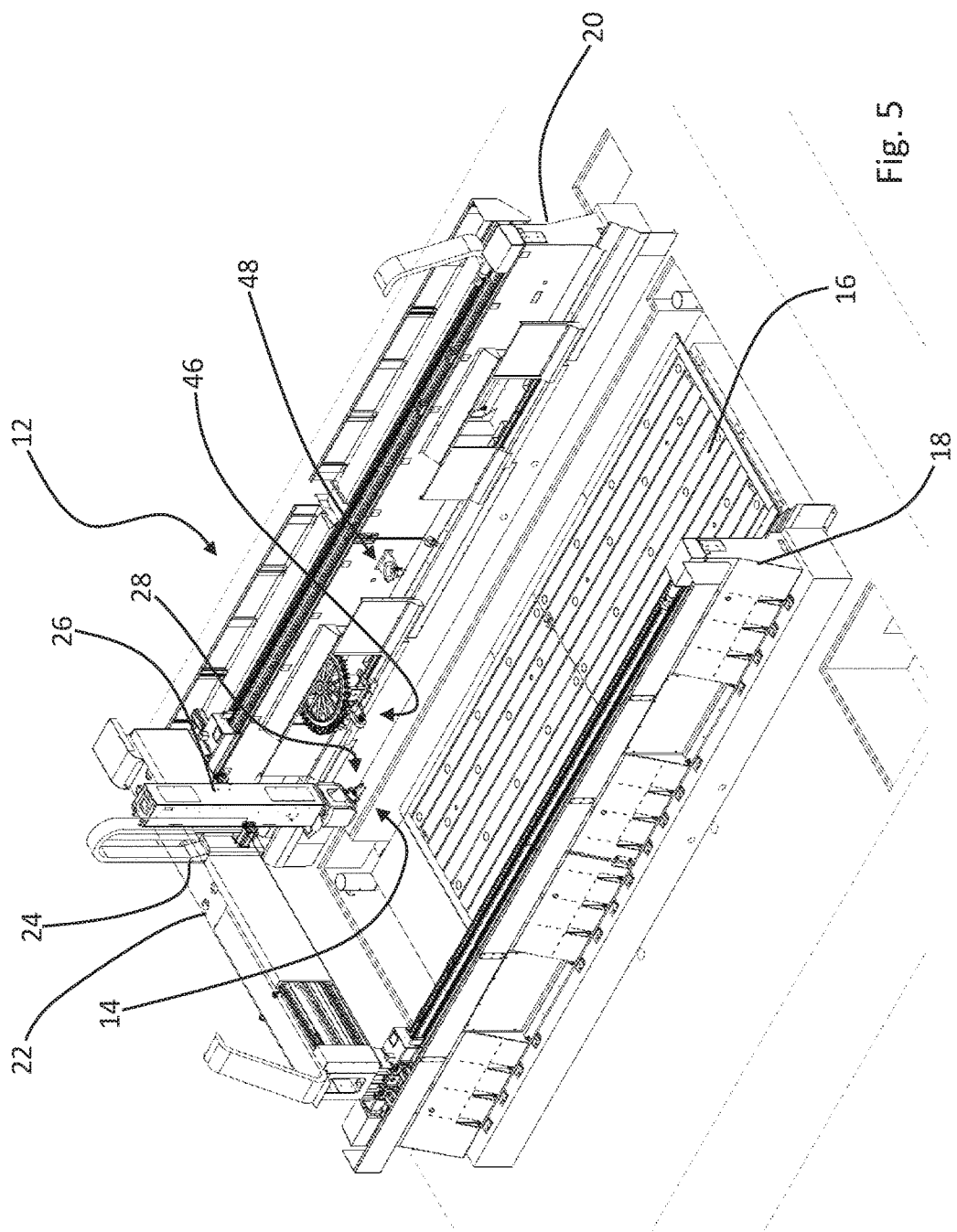

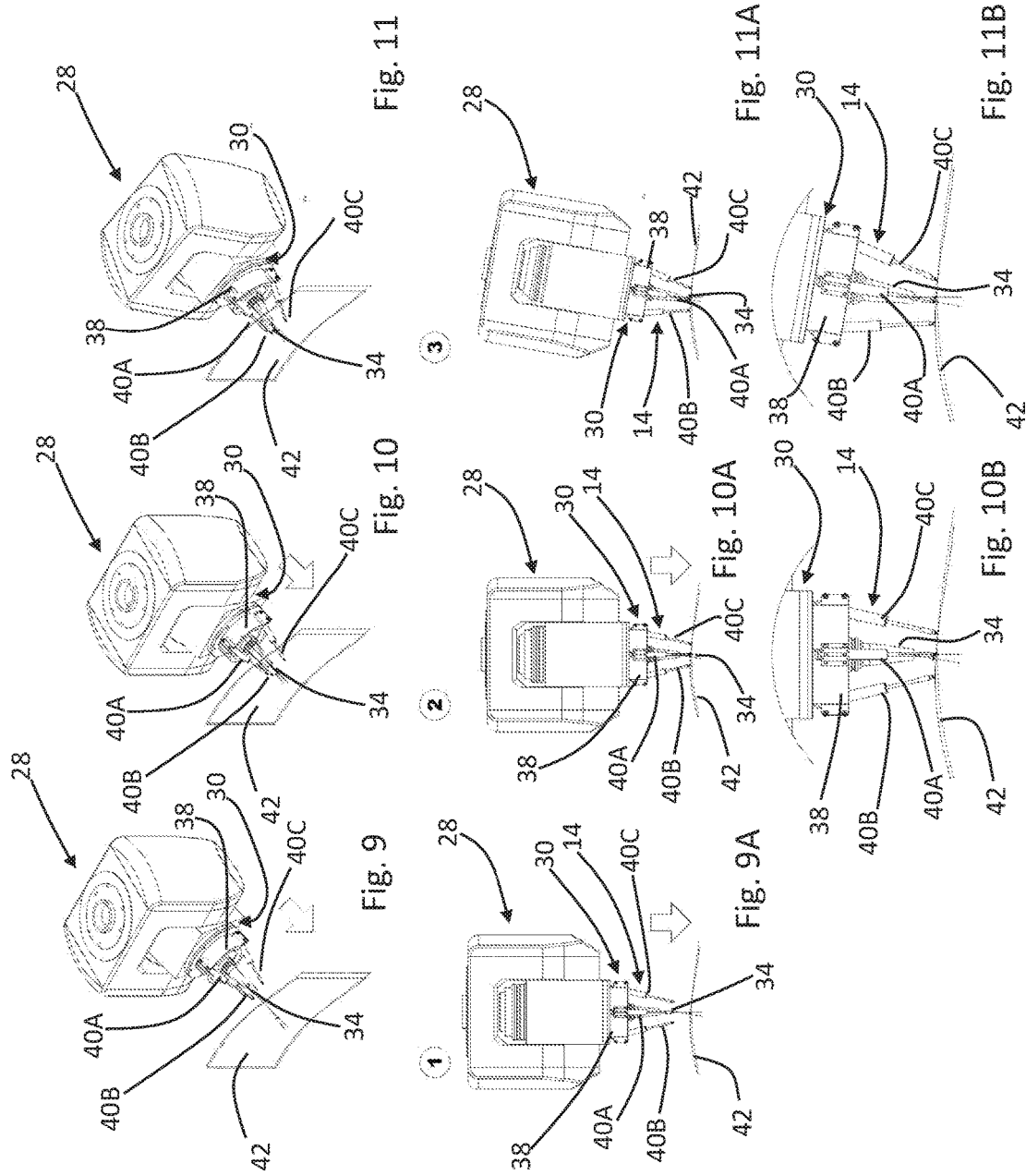

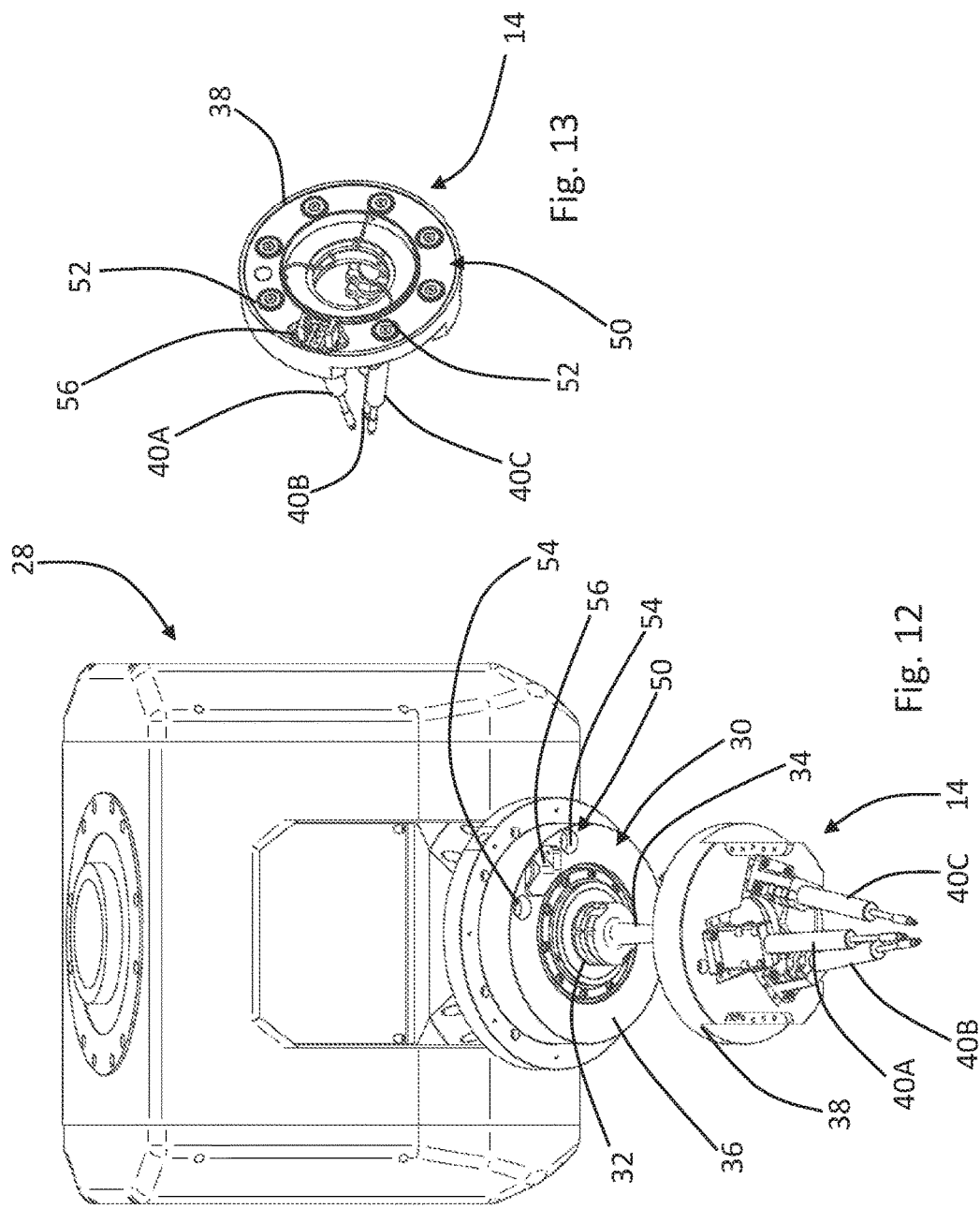

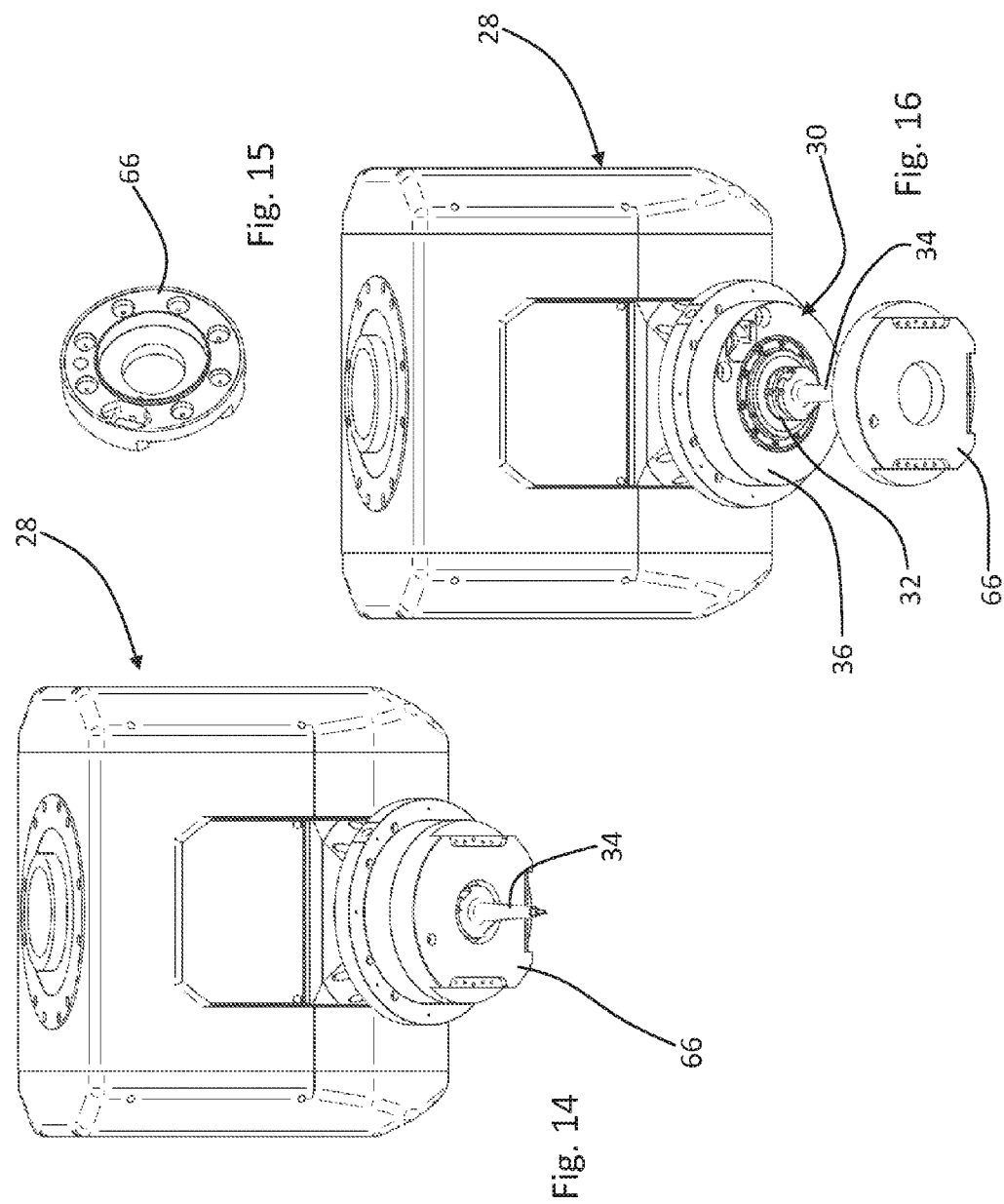

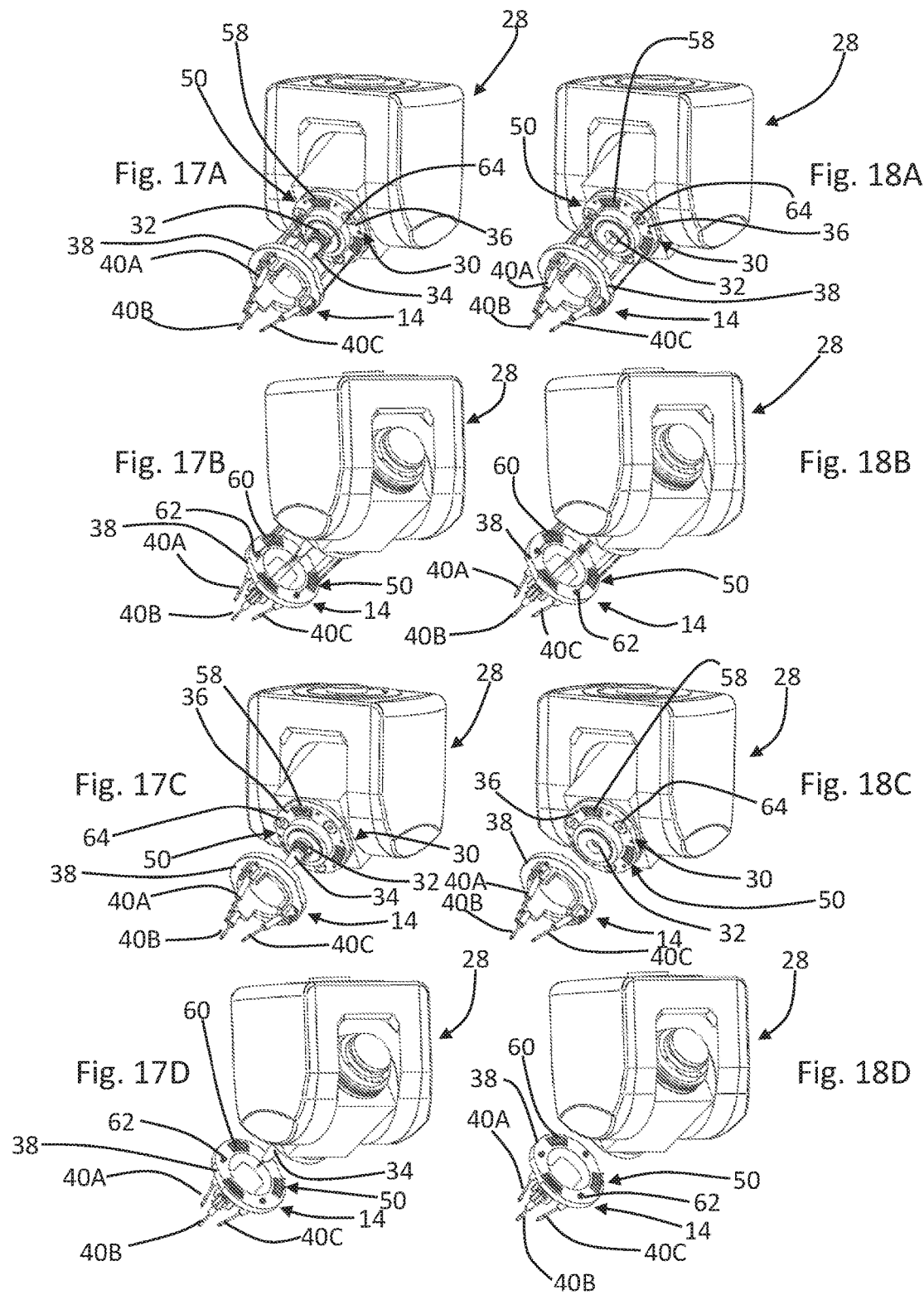

SENSING AND POSITIONING DEVICE FOR A MACHINING HEAD OF A MACHINE TOOL, MACHINE TOOL COMPRISING SUCH A DEVICE, AND ASSOCIATED MACHINING METHOD

FIELD OF THE INVENTION

The present invention relates to a sensing and positioning device for a machining head of a machine tool, a machine tool comprising such a device, and an associated machining method.

In particular, the present invention relates preferably to a 5-axis numerical control machine with a feedback system designed to perform machining operations such as boring, countersinking and threading, but also milling.

BACKGROUND

Among the various machining operations which may be performed using machine tools it is possible to identify so-called "point" type machining operations, where the tool is positioned on a specific point of the surface to be machined often in a direction perpendicular thereto, but also, in particular circumstances, in a direction inclined relative thereto and is then moved along its axis so as to be able to perform machining operations such as boring, countersinking, counterboring or threading.

Another type of machining operation are machining operations of "surface machining" type, namely machining operations such as milling or leveling whereby flat or curved surfaces are formed. In these machining operations, the tool, once the working depth has been defined, carries out machining, if necessary in several passes to increasingly greater depths, moving in directions substantially perpendicular to its axis of rotation.

The present invention relates mainly to the first type of machining operation, but also to particular cases of the second type of machining operation.

Below a possible example of a sequence of operations for machining of the "axial" or "point" type carried out perpendicularly with respect to the surface will be briefly described.

Before carrying out the operation, the end of the tool is positioned in the vicinity of the point of the surface the workpiece (defined "positioning point") with the machining head and therefore the spindle directed so that the axis of the tool is arranged along the perpendicular to the plane tangential to the surface passing through the contact point.

Then the end of the tool is positioned on the point of the surface of the workpiece (defined "contact point) where machining must be started.

As is known, numerical control machines comprise a programmable control unit and operate by means of a CAM program containing the machining cycle and other information necessary for machining the workpiece depending on its geometrical form.

In particular, owing to the control unit, the aforementioned machining operation may be performed in three steps:

1) a fast positioning step (also called "rapid movement") where the machining head is moved so that the end of the tool is positioned on the positioning point, situated slightly above the contact point and with the axis aligned with the perpendicular to the surface of the workpiece;

2) a slow approach step where the tool spindle is moved forwards along the direction of its axis until the tip of the tool comes into contact with the surface of the workpiece, thus moving from the positioning point to the contact point;

3) a machining step where the tool is moved forwards along the direction of its axis and penetrates into the material by an amount equal to the machining depth in order to carry out the required machining.

In the case where machining of the "axial" type must be carried out with a given inclination relative to the perpendicular to the surface of the workpiece, the same working sequence is employed except that the axis of the head is suitably directed so that it is inclined by the desired amount relative to the perpendicular to the surface.

In the case instead of "surface machining" operations, such as milling, machining is composed of the following steps:

1) a fast positioning step where the machining head is moved so that the end of the tool is positioned on the positioning point, situated slightly above the contact point and with the axis aligned with the perpendicular to the surface of the workpiece;

2) a slow approach step where the spindle with tool is moved forwards along the direction of its axis until the end of the tool comes into contact with the surface of the workpiece and then penetrates into the material to be machined to a depth equal to the machining pass;

3) a third step where the machining head is moved in the direction perpendicular to its machining axis in order to carry out the required machining operation, such as machining of a groove or a pocket.

Whatever the machining operation to be performed, it is of the fundamental importance that the tool, before starting machining, should be positioned correctly relative to the workpiece to be machined.

After positioning of the workpiece on the table (to be performed with great care), once the workpiece has been fixed, its fixing is checked, and using suitable measuring instruments, its correctly position in the machine.

Although the machines of the prior art are widely used and popular, they are not without drawbacks.

During the first positioning step, it may happen that the spindle is not positioned in the desired manner for various reasons linked, for example, to the article being machined, e.g.:

1) non-correspondence between the real dimensions of the article being machined and the designed dimensions;

2) imprecise positioning of the article being machined on the workpiece table;

3) movement of the article owing to a faulty fixing system.

As regards the tool, for example imprecise positioning of the tool tip may occur, namely the tip of the tool is not located at the required positioning point, or the axis of the tool is not precisely directed, or the axis is not perfectly perpendicular namely it is not inclined at the desired angle relative to the perpendicular to the surface.

In these situations the machining operations carried out have a depth and/or a position different from that desired.

The prior art has attempted to solve this technical problem by using sensing feelers mounted on the spindle nose, consisting of a single finger provided with a transducer able to detect with a series of sensing operations the real form and position of the surface on which machining is to be performed. The feeler may consist of many types, for example: mechanical contact (by means of transverse deflection or axial pressure) type, but also electrical contact, optical or opto-electronic type.

It has been noted, however, that the time required for machining increases significantly. In fact it is required to remove firstly the tool from the spindle nose and replace it with the sensing device which must then perform sensing of the surface by means of a plurality of sensing operations on specific points. Once the surface has been sensed, a control unit compares the measured values with the theoretical surface values. If the control unit determines a difference between the two values, it calculates the divergence between the real configuration and the theoretical configuration. Once the divergence, if present, has been calculated and the sensing tool replaced with the machining tool, the control unit moves the spindle applying a positioning correction depending on the divergence determined.

It is clear that, during this procedure, in addition to the time needed for sensing the surface of the article by the device, there is also the time required both for the tool changing operation and for moving the spindle between the tool crib and the surface of the article to be machined.

It has also been noted that the device and the sensing method described above are not suitable for solving positioning problems associated with a possible deformation of the material during machining.

This may happen for example, during the machining of articles such as metal sheets, which are thin and therefore not very rigid, or in the case of composite articles such as those where there is a stiffening structure lined on both sides with a covering surface, such as the wing structure of aircraft. In the zones of the covering surface which are situated at a distance from the rigid structure, the material is more deformable such that, following the stresses caused by machining, it could also flex or bend with the result that the machining is not carried out in a precise manner.

In extreme cases breakage or structural failure of the article being machined could also occur.

Finally, the system employed by the prior art is also not effective in the case where the article has moved owing to improper fixing.

All this results in a further increase in the production costs since the article resulting from imprecise machining must be subsequently discarded.

The object of the invention is therefore to solve, at least partially, the drawbacks of the prior art.

BRIEF SUMMARY OF EMBODIMENTS OF THE INVENTION

A first task of the present invention is to provide a sensing device which allows correct positioning of the spindle and therefore the tool, depending on the real configuration of the surface of the workpiece.

A second task of the present invention is to provide a sensing device which allows interruption of machining in the case where movement of the article being machined is detected, avoiding producing an article which must then be discarded.

A further task of the present invention is to provide a machine tool which incorporates said device and which is able to perform efficient machining of sheet metal articles or composite articles or generally materials which could be deformed during machining.

Moreover, the aim is to provide a device, a machine, incorporating such a device, and a method which, in the event of movements of the article during machining or deformation or failure of the material above a certain limit, immediately interrupts machining, thus preventing incorrect machining or irremediable damage to the article. In particular, the aim is to provide a machine suitable for machining materials which could be deformed or could move within certain limits during machining.

The object and the advantages are achieved with a sensing and positioning device for a machining head of a machine tool according to claim 1, a machine comprising such a device according to claim 7 and an associated machining method according to claim 17.

As will appear more clearly below, the machining head of a machine tool has, connected thereto, a sensing and positioning device adapted to detect error situations, such as incorrect initial positioning of the workpiece on the machine, errors in fixing the workpiece on the workpiece table or the like, without the need for a tool changing operation.

Moreover, the sensing and positioning device according to the present invention allows the machining head to be positioned and directed correctly with respect to the workpiece on which the required machining is to be carried out, also dynamically, detecting continuously the actual configuration of the article being machined and comparing it with the theoretical configuration so as to correspondingly move the head.

BRIEF DESCRIPTIONS OF DRAWINGS

The advantages and characteristic features of the present invention will emerge more clearly from the detailed description below of a number of examples of embodiment provided by way of a non-limiting example, with reference to the attached drawings in which:

FIG. 5 shows a perspective view of a machine according to the present invention;

FIGS. 9-9A show a perspective view and front view of a machining head according to the present invention in a possible operating situation;

FIGS. 10, 10A, 10B show a perspective view, a front view and an enlarged detail of the front view of a machining head according to the present invention in a possible operating situation;

FIGS. 11, 11A, 11B show a perspective view, front view and an enlarged detail of the front view of a machining head according to the present invention in a possible operating situation;

FIG. 12 show a front view of a machining head and a sensing and positioning device according to the present invention;

FIG. 13 shows a view from behind of a sensing and positioning device according to the present invention;

Figure 1A:
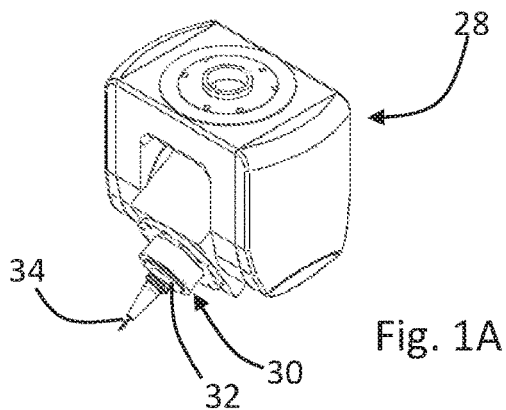
FIGS. 1A-1B show respectively a perspective view and a front view of a spindle and a machining head of a machine tool, with tool mounted.

FIGS. 14, 15, and 16 show a possible embodiment of a component of the present invention;

FIGS. 17A-17D show an alternative embodiment of the sensing and positioning device according to the present invention, in the vicinity of a machining head with tool engaged; and FIGS. 18A-18D show an alternative embodiment of the sensing and positioning device according to the present invention, in the vicinity of a machining head with tool not engaged.

DETAILED DESCRIPTION OF EMBODIMENTS OF THE INVENTION

In FIG. 5 it is shown a machine 12 on which a sensing and positioning device 14 (referred to hereinbelow also only as sensing device 14) according to the present invention is mounted.

In order to clarify the scope of protection of the present invention, firstly an example of a machine tool 12 to which the device of the present invention may be applied will be described, it being obviously understood that the embodiments which will be described are merely examples which do not limit the scope of protection defined by the accompanying claims.

In accordance with a possible embodiment of the present invention, the machine 12 comprises a workpiece table 16. The workpiece table 16 may be adapted for fixing brackets (not shown) on its surface, for locking in position articles which are to be machined.

Along the sides of the workpiece table 16, two lateral support structures 18, 20 are arranged facing each other and have a sliding beam 22 arranged between them. The beam 22 may slide on top of the lateral support structures 18, 20 owing to sliding travel means known per se to the person skilled in the art. Since these means are not strictly linked to the inventive ideas of the present invention, they will not be further described.

On the beam 22 it is provided a carriage 20 sliding along the said beam 22. In this case also the means used for the sliding travel of the carriage 24 are per se known to the person skilled in the art and, since they do not form a specific subject of the present invention, they will not be further described.

A tubular sleeve 26 is positioned on the carriage 24 and is provided on its bottom end with a machining head 28. The tubular sleeve is adapted to move the machining head in the vertical direction towards or away from the workpiece table 16.

In the figures, for easier reference, a machining head 28 of the fork type is shown in the figures. This reference is not limiting in any way as regards the type of head which may be mounted on the machine of the present invention. Birotational heads offer in any case a series of advantages associated with the possible positioning adjustments of the tool and are for this reason preferable in the machines of the present invention.

The machining head 28 comprises a spindle 30 (see FIGS. 1 and 2) with a spindle nose 32 on which a machining tool 34 may be mounted.

The machining tool 34 may have a conical mount of the standard type, known per se to the person skilled in the art and able to be engaged directly by the spindle nose 32.

A boring, countersinking or threading tool (for forming the thread in a hole), but also a milling tool, may for example be attached to the spindle nose 32.

The sensing and positioning device 14 according to the invention is mounted on the end of the spindle 30.

Advantageously, the sensing device 14 may be fixed to the front surface 34 of the spindle 30, which surrounds the spindle nose 12.

Figure 2A:
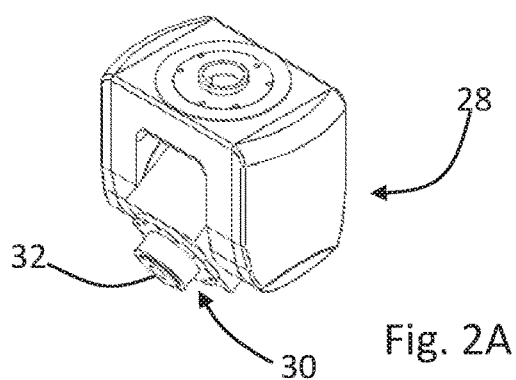
FIGS. 2A-2B show respectively a perspective view and a front view of a spindle and a machining head of a machine tool, without tool.
Figure 1B:
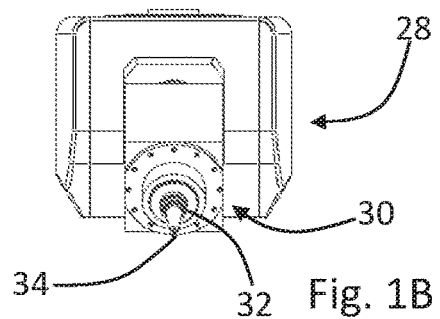
Figure 2B:
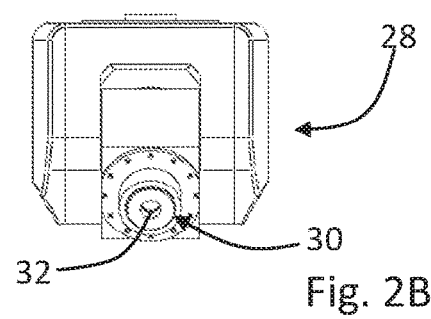
Figure 3A:
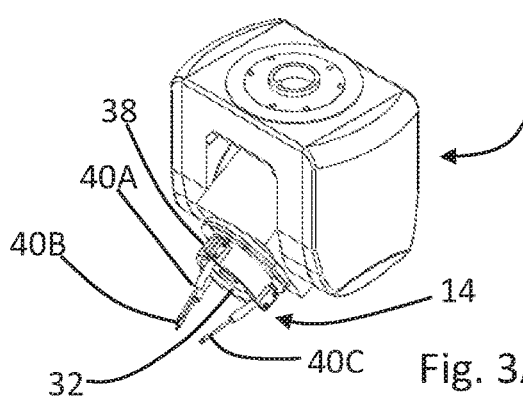
FIGS. 3A-3B show respectively a perspective view and a front view of a spindle and a machining head of a machine tool, without tool, but with the sensing and positioning device mounted.
Figure 4A:
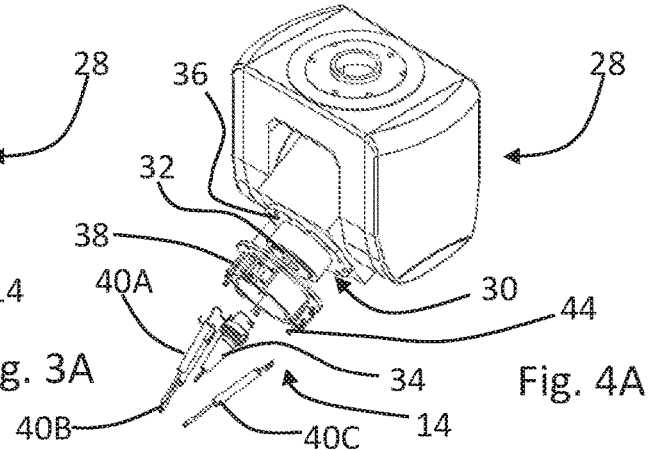
FIGS. 4A-4B show respectively a perspective view and a partially exploded front view of a spindle and a machining head of a machine tool, with tool and sensing and positioning device mounted.
Figure 3B:
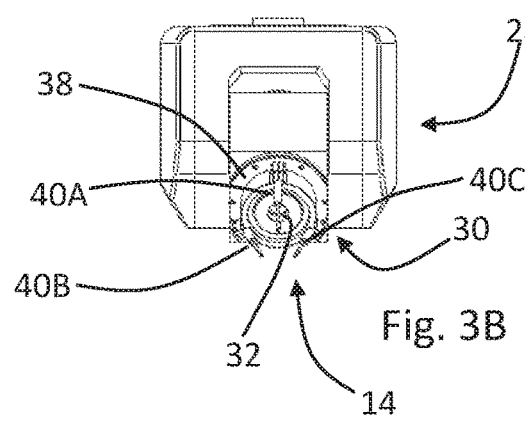
Figure 4B:
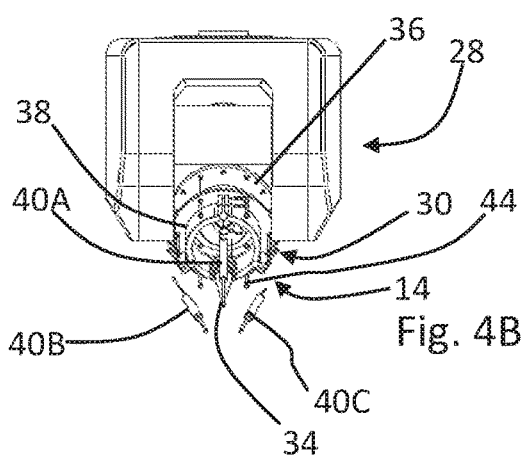

In order to understand properly the relative positioning of machining tool 34 and sensing device 14, FIGS. 1A to 4B show a machining head in various conditions and positions. In particular:

FIGS. 1A-1B show a machining head 28 with machining tool 34, but without sensing device 14;

FIGS. 2A-2B show a machining head 28 without sensing device 14 and without machining tool 34;

FIGS. 3A-3B show a machining head 28 with sensing device 14 and without machining tool 34;

FIGS. 4A-4B show a machining head 28 with sensing device 14 and with machining tool 34.

In accordance with a possible embodiment of the present invention the sensing device 14 comprises a fixing element 38 with at least three sensing elements 40A, 40B, 40C (see FIGS. 3A, 3B, 4A and 4B).

In accordance with a possible embodiment of the present invention the fixing element 38 is a support flange.

Advantageously, the sensing elements 40A, 40B, 40C are arranged on the support flange 38 equidistant from each other along a circumference.

According to a possible embodiment of the present invention, the three sensing elements 40A, 40B, 4C may be positioned so as to be slightly inclined relative to the axial direction of the support flange 38 and converging towards each other.

In this way, when the support flange 38 is mounted on the spindle nose 32, the sensing elements 40A, 40B, 40C are adapted to detect points on the surface of the article which are very close to the point where the machining is performed and which is located aligned with the axial direction of the support flange 38.

In accordance with a possible embodiment of the present invention, the sensing elements 40A, 40B, 40C are needle-like feelers. A transducer able to detect the position of the end of each needle is connected to each feeler.

As already mentioned above, the three feelers 40A, 40B, 40C (which are indicated by the same reference numbers as the sensing elements) may be positioned so as to be slightly inclined relative to the axial direction of the support flange 38 and converging towards each other.

In this way it is possible to move the three ends of the feelers 40A, 40B, 40C towards the measurement point (which is the central point) in order to reduce to a minimum the measurement error. In the specific case, the three feelers 40A, 40B, 40C are inclined at an angle of between 20° and 10° and preferably around 15°.

In any case the value of the inclination depends on the size of the support flange 38, and in particular the diameter of the circumference along which the feelers 40A, 40B, 40C are fixed onto the support flange 38 and on the circumference passing through the three ends of the feelers 40A, 40B, 40C, and also on their length.

In the operating condition, with the sensing device 14 positioned on the spindle 30, the axis of the flange 38 coincides with the axis of rotation of the spindle 30 and therefore the tool 34.

As is known, a single and sole plane passes through three points in space. Therefore, in order to sense the surface of the article being machined, it is necessary for all three feelers 40A, 40B, 40C to touch it, so that the feelers must be able to retract by a certain amount, defined as a pretensioning force.

In fact, while in the case of flat surfaces the three feelers come into contact with the surface of the workpiece simultaneously (assuming that the axis of the spindle is perpendicular to the surface of the workpiece), in the case of curved surfaces there is the possibility that the three feelers will not make contact at all with the surface of the workpiece simultaneously even though the axis of the flange is perpendicular to the surfaces of the workpiece at that point.

In this way it is possible to compensate also for any physical differences (albeit minimal) between the feelers.

In general one feeler will make contact first, a second feeler will then make contact, followed by a third feeler which will make contact last.

Owing to the pretensioning force, all three feelers may touch the surface of the workpiece in order to detect the position of the point touched and therefore obtain information regarding the plane passing through these three points.

FIGS. 9-9A show a machining head 28 of a machine tool 12 moving towards a surface 42 of an article.

FIGS. 10, 10A, 10B show a machining head 28, the sensing device of which is in contact with the surface 42 of an article. In this case, the axis of the sensing device and therefore of the tool is perpendicular to the surface 42 which is to be machined.

FIGS. 11, 11A, 11B also show a machining head 28, the sensing device of which is in contact with the surface 42 of an article. In this case, however, the axis of the sensing device and therefore of the tool is inclined with respect to the direction perpendicular to the surface 42 which is to be machined.

With the sensing device 14 according to the present invention it is possible to detect the position of the article before starting machining and during the course of machining.

For example, in the case where sensing is performed before machining, the information supplied by each of the three transducers, namely the measurement of the three points touched on the surface of the workpiece is sent to the control unit and compared with the theoretical position of the three contact points, defined by the numerical model of the article stored in the control unit.

Should there be a divergence between the real position and theoretical position of the three points sensed, the control unit determines the degree of the corrections to be made which may consist for example of linear and/or angular displacements of the machining head, which is moved slightly away from the surface 42 of the article, suitably oriented and displaced, incorporating the corrections calculated, and then moved back towards the surface 42 so that the tip of the tool is located at the exact positioning point and directed correctly.

At this point the machining head 28 will advance along the axis of the tool 34 such that it will move from the positioning point to the contact point where the tool 34 comes into contact with the surface 42 of the article.

Then, in the case of axial machining operations, the tool 34 will continue axially so as to perform the actual machining operation, while in the case of milling machining operations the tool will be moved forwards axially so as to penetrate into the material by an amount equal to the depth of the machining pass and is then moved transversely relative to the tool in order to perform the actual machining operation.

The sensing device is adapted to detect during machining the position of the article.

In fact, during machining, the three feelers remain active and in contact with the surface 42 of the article, sensing continuously the correct position and direction of the head and hence of the tool.

Considering that, during machining also, the feelers must retract the minimum retraction length of the feelers must be equal to the sum of the maximum pretensioning length and the maximum machining depth, allowing also for a sufficient safety margin.

In accordance with a possible embodiment of the present invention, the pretensioning length may be in the region of 1 cm.

Moreover, assuming, for example, a machining depth of about 4 cm, the retraction length of each feeler may be for example in the region of 5.5 cm.

The milling operations which may be performed with a sensing device according to the present invention are limited in that the three feelers 40A, 40B, 40C, moving together with the machining tool 34, make sliding contact on the workpiece, differently from that which occurs in axial machining operations where there is no sliding contact.

It is pointed out, however, that also during the axial machining operations the ends of the three feelers also make very slight sliding contact with the surface of the workpiece owing to the fact that the three feelers are slightly inclined.

In the case of milling, the sliding contact is instead decidedly greater and it is precisely this which limits the operations which may be performed only to those where the milling area and depth are small.

Moreover, since "point" type surface machining operations (boring, countersinking and threading) or operations for machining small-size areas are involved, the amount of swarf produced is minimal, so that there is no risk of damaging the feelers.

Should the article move during machining, owing to:
faulty fixing,
material deformation or failure,
movement of the workpiece on the fixing equipment,
the error is readily detected.

In accordance with a possible embodiment of the present invention, if this error exceeds a minimum threshold level, which may be advantageously chosen and set on the programmable control unit of the machine tool, machining may be interrupted by immediately separating the tool 34 from the surface 42 of the article and sending an alarm signal to the operator.

The possible systems for connecting together spindle 30 and sensing and positioning device 14 according to the present invention will now be described in detail.

As can be seen for example in FIGS. 4A-4B, the flange 38 of the sensing device 14 may be fixed by means of screws 44 to the front surface 36 of the spindle 30. Whenever it is required to perform machining of the aforementioned type (boring, countersinking, counterboring, threading) it is required to stop operation of the machine and perform mounting of the flange 38.

Figure 6:
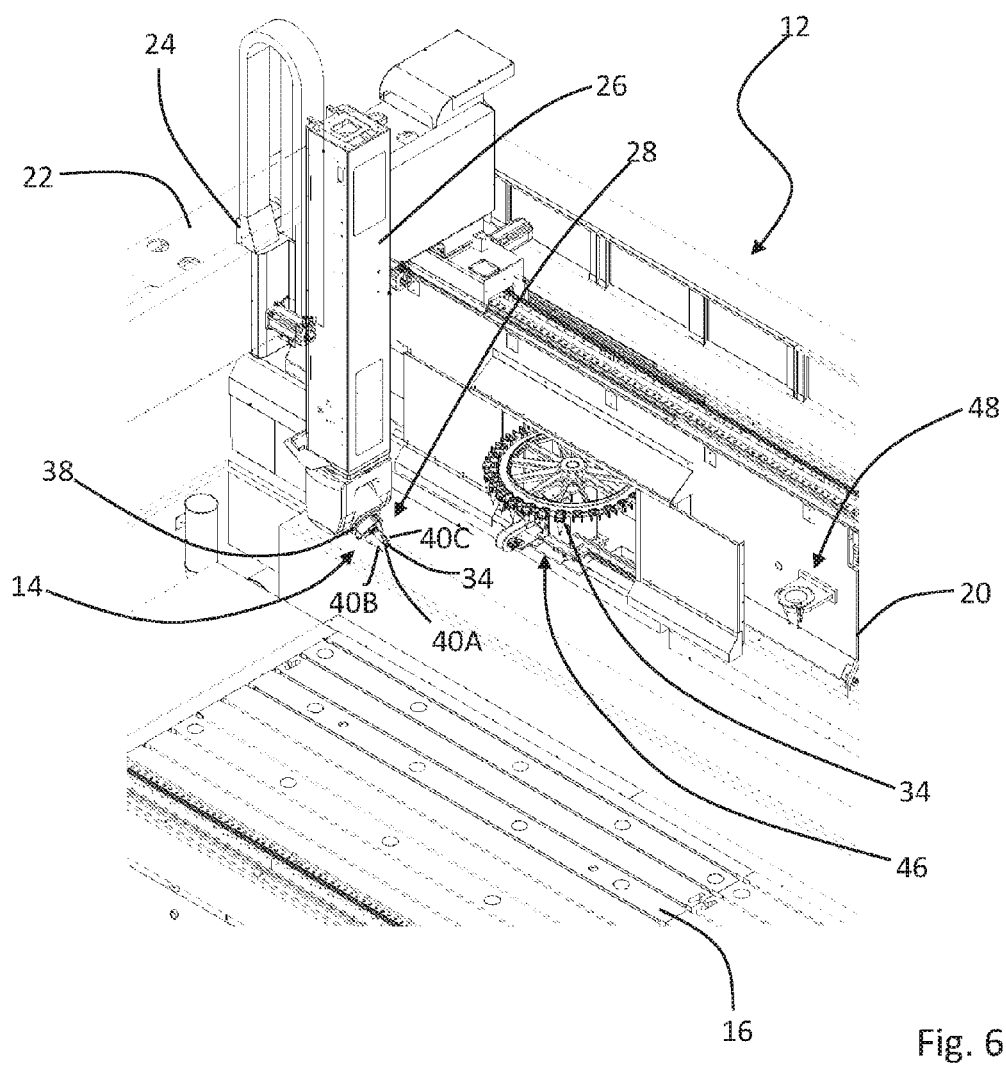
FIG. 6 shows a portion, on a larger scale, of the machine according to FIG. 5.
Figure 7:
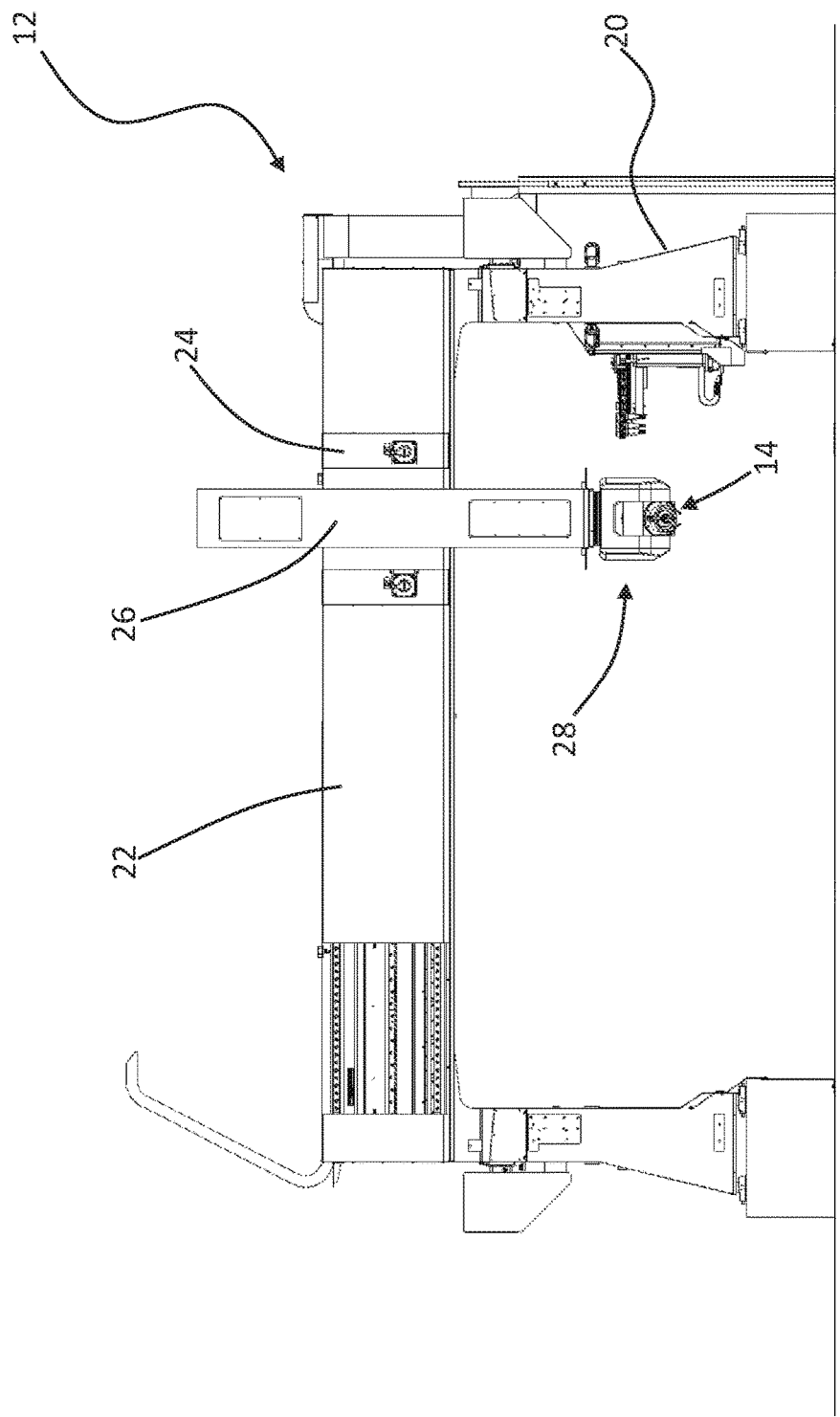
FIG. 7 shows a front view of the machine according to FIG. 5.
Figure 8:
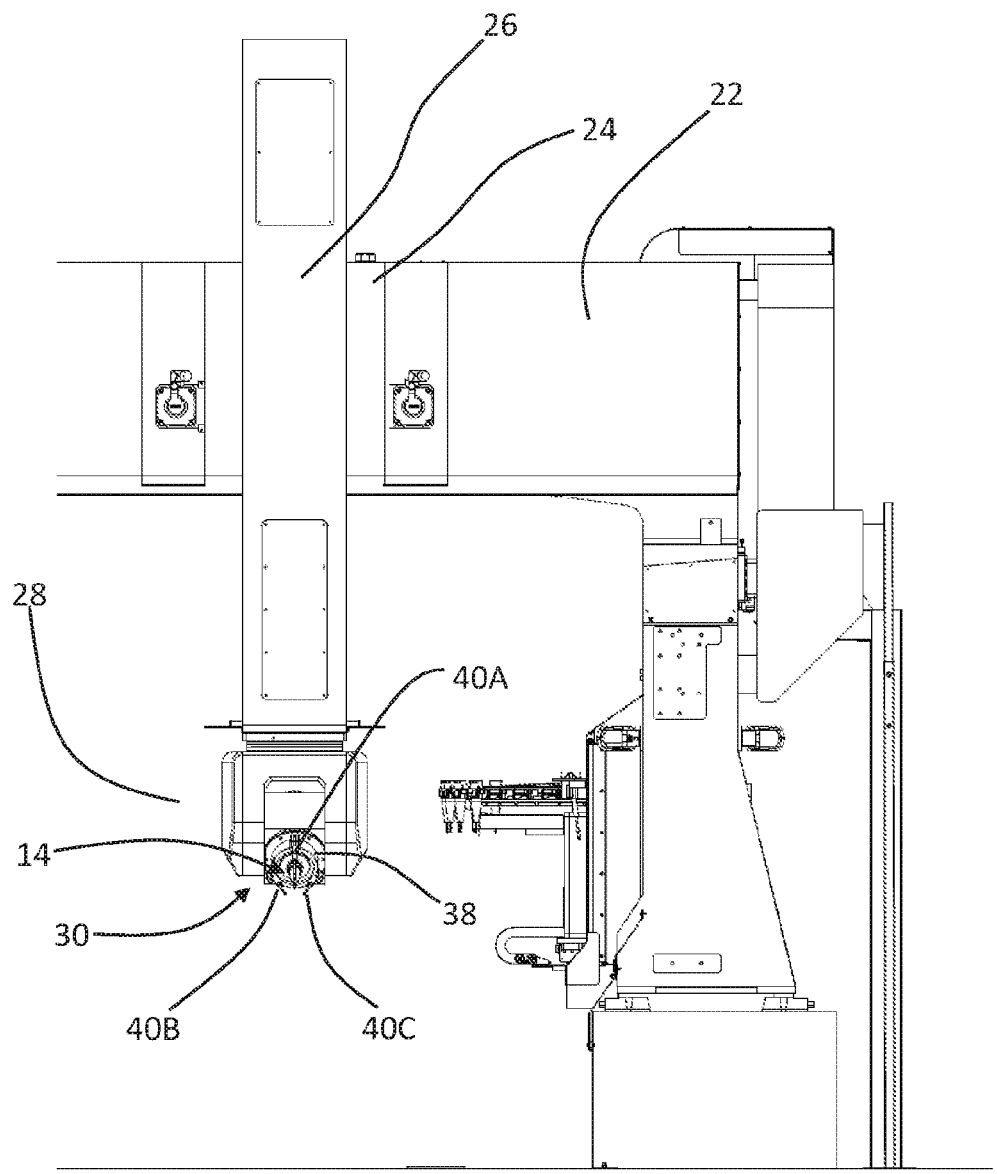
FIG. 8 shows a portion, on a larger scale, of the machine according to FIG. 7.

As can be seen in FIGS. 5 and 6, the machine according to the present invention may comprise a tool crib 46 and a storage seat 48 for the sensing device 14 in the case where it is automatically removed and attached to the end of the spindle 30.

FIGS. 12 and 13 show an alternative embodiment of the present invention in which the sensing device 14 is adapted to be attached to the end of the spindle 30 by means of suitable automatic fastening means 50.

In this way it is no longer required to stop operation of the machine in order to mount the device, but the latter may be simply picked up and attached to the spindle.

The flange may have, inserted or better incorporated therein, magnets (three in number, but the number could obviously be different). The magnets allows the flange 38 to be attached simply and quickly to the front surface 36 of the spindle 30.

The spindle 30 need not be provided with corresponding magnets, since it is made of metallic material and therefore is ferromagnetic.

It is clear that the spindle 30 could also in turn be provided with magnets so as to exert a greater force of attraction between the two elements. Alternatively, the magnets could be present only on the bottom of the spindle.

It should be considered that the feeler device is not subject to particular stresses since it simply rests on the surface to be sensed and, therefore, in short the force to be overcome is essentially the weight force of the device itself.

Centering of the sensing device 14 and therefore of its flange 38 with the spindle may be obtained, for example because:
- the flange 30 can be provided with a cylindrical shank which is inserted inside a cylindrical cavity formed on the bottom of the spindle;
- the flange 38 can be provided with at least one centering pin 52, while the bottom of the spindle 30 may have at least one corresponding receiving cavity 54.

It should also be noted that means 56 are provided for movable electrical connection between flange 38 and spindle 30, said connection being necessary in order to connect electrically together the three feelers with the programmable control unit of the machine.

Advantageously, a male electrical connector may be provided on the flange 38, while a corresponding female electrical connector may be provided on the front surface 36 of the spindle 30.

For mounting of the sensing device 14, the spindle 30 is merely positioned close to the storage seat 48 where the device is arranged, moves towards it, engages it by means of the magnets and then extracts it from the gripper holding it.

In order to deposit the device in the storage seat the device must merely be inserted inside the gripper and then the spindle moved upwards so that the device remains anchored inside the gripper and is thus detached from the spindle.

It is preferable to attach firstly the device 14 and then the machining tool 34, but the reverse sequence is also possible.

FIGS. 17A-18D show an alternative embodiment of the automatic attachment means 50.

The faces of the flange 38 and the spindle 30 which are joined together may be each provided with three Hirth teeth, indicated by the reference numbers 58, 60, for centering the flange 38 and the spindle 30, preferably arranged circumferentially and equidistant from each other.

In order to fix the flange 38 on the spindle 30, at least one pneumatic ZPS (Zero Point System) attachment device may be used.

The ZPS attachment device comprises:
- a first element consisting of a pin 62 on which a circumferential groove is formed;
- a second element consisting of a hollow cylindrical body 64 which contains a ball bearing ring adapted to engage with the circumferential groove of the pin 62 so as to fix it in position.

The second element is provided with Belleville springs which push the ball bearing ring outwards and a duct for pressurized air which acts in the opposite direction, so as to cause retraction of the ball bearing ring.

When it is required to engage the pin 62, compressed air is supplied into the duct, the Belleville springs are compressed, the ball bearing ring retracts and the pin may be inserted inside the cylindrical body. At this point the compressed-air flow is interrupted the ball bearing ring is displaced outwards and is forced inside the circumferential groove of the pin, locking it.

In order to release the pin, it is sufficient to supply the duct with compressed air, so that the ball bearing ring moves back in, compressing the Belleville springs and the pin may thus be extracted from the cylindrical body.

In accordance with a possible embodiment of the present invention, the device 14 comprises three pins 62, while the front surface of the spindle 30 comprises three corresponding hollow cylindrical bodies 64.

In this embodiment also the electrical connection means present in the previous embodiment (see FIGS. 12 and 13) may also be provided, but are not shown in the attached figures.

FIGS. 14-16 show a possible form of the machining head according to the present invention. In particular, the figures show a cover 66 which may be fitted on the bottom end of the spindle 30 when the sensing device 14 is not used. Advantageously, the cover 66 may seal off the female electric connector present on the bottom of the spindle. In this way it is possible to protect the female electric connector from the jets of lubricating/cooling fluid and the machining swarf.

In accordance with a possible embodiment of the present invention, the cover may be very similar to the flange and therefore may also be provided with magnets and centering pins so as to close off completely the bottom of the spindle, and in particular the electric connector, thus preventing it from becoming soiled and oxidizing during machining.

Fitting and removal of the cover for protecting the bottom of the spindle may be performed in a manner entirely similar that performed for the sensing device.

The advantages which may be achieved with the present invention are therefore now evident.

Firstly, the aforementioned machining operations (boring, countersinking, counterboring and threading) are carried out in accordance with the design specifications and, in particular, are carried out at the exact point and with correct directional positioning of the tool axis.

Moreover the machining operations are carried out to the required depth without errors. In fact, since the starting point is the exact point of contact with the surface of the workpiece, the depth will also be exact.

In the case of countersinking operations, the perfect depth and diameter of the countersink are ensured.

Let it be assumed, in fact, that the surface of the workpiece will not be flat but, owing to the irregularities, is slightly curved. If the sensing device were not to be used in the case of convex surfaces the countersink would be greater than that required, while in the case of concave or inwardly curved surfaces the countersink would be less.

Instead, as a result of the sensing device described above, the countersink is carried out always correctly, irrespective of any irregularities in the surface of the workpiece.

The milling machining operations may also be carried out in accordance with the design specifications, since they are performed correctly from the starting point while monitoring the position of the tool during the entire machining operation.

Essentially, among other things, with the device according to the present invention, it is possible to:
 position and adjust correctly the direction of the tool relative to the workpiece at the initial machining point;
 monitor the position and the direction of the tool during the machining step.

It is clear that it is also possible to perform only the first operation, even though it is preferable to make use of the device for both operations.

The device is particular suitable for the machining of deformable materials such as sheet metal elements and composite materials composed of a reinforcing core lined on both sides with a covering sheet.

The person skilled in the art, in order to satisfy specific requirements, may make modifications to the embodiments described above and/or replace the parts described with equivalent parts, without thereby departing from the scope of the accompanying claims.

In particular, more than three sensing elements could be used.

Moreover, different sensing systems could be used, for example optical systems, as will be now evident to the person skilled person skilled in the art.

The description has been provided with reference to a 5-axis machine, but the innovative concepts of the present invention may also be applied to machines having a smaller or greater number of axes.

Moreover, the means for moving the machining head above the workpiece table may comprise a movable gantry structure.

The machine moreover need not be a machine of the Cartesian type, such as that described, but could be of another type, such as a machine with an anthropomorphic or robot arm.

The invention claimed is:

1. Sensing and positioning device adapted to be mounted on a spindle of a machine tool, comprising:
 a fixing element; and
 at least three sensing elements adapted to be connected operationally to a programmable control unit of the machine tool;
 said sensing and positioning device usable with a tool mounted on the spindle, initially and during execution of a machining operation by the tool, whereby said sensing and positioning device is adapted to sense in a continuous manner a surface of an article during the machining operation;
 wherein said at least three sensing elements are feelers, each having a shape of a needle.

2. The device according to claim 1, characterized in that said programmable control unit is adapted to compare continuously the surface sensed by the sensing and positioning device with a theoretical machining surface.

3. The device according to claim 1, characterized in that said fixing element is a support flange adapted to be fixed onto a front surface of a nose of the spindle along with the machining tool.

4. The device according to claim 3, characterized in that said feelers are each connected to a transducer adapted to detect a position of an end of each of the feelers.

5. The device according to claim 4, characterized in that the at least three sensing elements are arranged equidistant along a circumference of the support flange and are inclined relative to an axial direction of the support flange so as to converge.

6. The device according to claim 5, characterized in that the at least three sensing elements are inclined at an angle of between 20° and 10° relative to the axial direction.

7. A machine tool comprising a workpiece table, a machining head and movement means which are adapted to move the machining head above the workpiece table, said machining head comprising a spindle which comprises a sensing and positioning device attachable to said spindle;
 wherein the sensing and positioning device comprises:
  a fixing element; and
  at least three sensing elements adapted to be connected operationally to a programmable control unit of the machine tool;
 said sensing and positioning device usable with a tool mounted on the spindle, initially and during execution of a machining operation by the tool, whereby said sensing and positioning device is adapted to sense in a continuous manner a surface of an article during the machining operation via the at least three sensing elements, the at least three sensing elements oriented so as to contact the article surface during the continuous sensing;
 wherein said at least three sensing elements are feelers, each having a shape of a needle.

8. The machine tool according to claim 7, characterized in that the sensing and positioning device is fixed by means of screws to a front surface of a nose of the spindle.

9. The machine tool according to claim 7, characterized in that the sensing and positioning device is adapted to be attached to an end of the spindle by an automatic fastening means.

10. The machine tool according to claim 9, characterized in that the fixing element of the positioning and sensing device is provided with magnets and has a cylindrical shank which is inserted inside a cylindrical cavity formed on a bottom of the spindle, and the positioning and sensing device is provided with at least one centering pin, while the bottom of the spindle has at least one receiving cavity.

11. The machine tool according to claim 9, characterized in that faces of the fixing element of the sensing and positioning device and of the spindle which are joined together are each provided with Hirth teeth for centering the sensing and positioning device relative to the spindle so as to be arranged circumferentially and equidistant relative to an axis of the spindle.

12. The machine tool according to claim 11, characterized in that the sensing and positioning device comprises an attachment device of a ZPS type.

13. The machine tool according to claim 7, characterized in that said movement means comprise two lateral support structures facing each other and a beam arranged between, and adapted to slide on top of, the lateral support structures, said beam being provided with a carriage sliding along the beam, a tubular sleeve being positioned on the carriage and having the machining head mounted on a bottom end.

14. The machine tool according to claim 7, characterized in that the movement means comprise an anthropomorphic or robot arm.

15. The machine tool according to claim 7, characterized in that the movement means comprise a movable gantry structure.

16. Machining method using a machine tool, comprising the steps of:
 a) mounting a machining tool and a sensing and positioning device on a spindle;
 b) moving the sensing and positioning device until contacting a surface of a workpiece;

c) sensing and measuring contact point by the sensing and positioning device;

d) whereby if the contact point corresponds to a theoretical point, moving the machining tool in an axial direction in order to perform machining and, where necessary, subsequently moving the machining tool in a direction perpendicular to the axial direction; and if the contact point does not correspond to the theoretical point, repositioning the machine head depending on sensed contact point;

wherein the machine tool comprises a workpiece table, a machining head and movement means which are adapted to move the machining head above the workpiece table, said machining head comprising the spindle which comprises a sensing and positioning device attachable to said spindle;

wherein the sensing and positioning device comprises:

a fixing element; and at least three sensing elements adapted to be connected operationally to a programmable control unit of the machine tool;

said sensing and positioning device usable with a tool mounted on the spindle, initially and during execution of a machining operation by the tool, whereby said sensing and positioning device is adapted to sense in a continuous manner a surface of an article during the machining operation.

17. The machining method according to claim 16, characterized in that, during machining, the workpiece surface sensed by the sensing and positioning device is compared continuously with a theoretical machining surface.

18. The machining method according to claim 17, characterized in that, if divergence between the sensed workpiece surface and the theoretical surface is greater than a threshold value, machining is interrupted.

19. The device of claim 1, wherein the article differs from the tool or the spindle.

* * * * *